US011159954B2

(12) United States Patent
Kounev et al.

(10) Patent No.: US 11,159,954 B2
(45) Date of Patent: Oct. 26, 2021

(54) INTERACTIVE NETWORK PLANNING BASED ON FRESNEL ZONE

(71) Applicant: AT&T Intellectual Property I, L.P., Atlanta, GA (US)

(72) Inventors: Velin Kounev, Weehawken, NJ (US); Yaron Kanza, Fair Lawn, NJ (US); Arun Jotshi, Parsippany, NJ (US); Krystian Czapiga, Hillsborough, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 16/784,937

(22) Filed: Feb. 7, 2020

(65) Prior Publication Data
US 2021/0250777 A1    Aug. 12, 2021

(51) Int. Cl.
*H04W 16/18*        (2009.01)
*H04W 72/04*        (2009.01)
(Continued)

(52) U.S. Cl.
CPC ............... *H04W 16/18* (2013.01); *G01S 5/02* (2013.01); *G01S 5/0215* (2013.01);
(Continued)

(58) Field of Classification Search
CPC .. H04B 7/0617; H04B 17/318; H04B 7/0452; H04B 7/0626; H04B 7/0632; H04B 7/0695; H04B 1/7103; H04B 7/0456; H04B 7/0469; H04B 7/088; H04B 17/391; H04B 7/022; H04B 7/0413; H04B 7/0417; H04B 7/0634; H04B 7/0639; H04B 17/12; H04B 17/309; H04B 17/336; H04B 7/0408; H04B 10/112; H04B 17/0085; H04B 17/30; H04B 17/373; H04B 17/382; H04B 17/3911; H04B 17/3912; H04B 2201/709718; H04B 7/0404; H04B 7/043; H04W 72/042; H04W 16/18; H04W 24/08; H04W 72/0413; H04W 16/28; H04W 24/10; H04W 72/04; H04W 16/14; H04W 16/22; H04W 24/02; H04W 48/12; H04W 48/20; H04W 4/025; H04W 76/27; H04W 84/12; H04W 52/02;
(Continued)

(56) References Cited

U.S. PATENT DOCUMENTS 6,356,758 B1 *  3/2002  Almeida ............... H04W 16/18
                                                 455/422.1
2004/0171352 A1 *  9/2004  Maeda .................... H04B 1/10
                                                 455/67.13
(Continued)

*Primary Examiner* — Fred A Casca
(74) *Attorney, Agent, or Firm* — Amin, Turocy & Watson, LLP

(57) ABSTRACT

Architectures and techniques are presented that improve or enhance a network planning procedure such as interactively planning suitable locations for transceiver sites that communicate with one another. Map data indicative of a 3D depiction of a physical space can be presented to a user interface device. Input indicative of a first transceiver site and a second transceiver site can be received. A Fresnel zone between the first transceiver site and the second transceiver site can be determined based on the map data. An interactive representation of the Fresnel zone can be presented to the user interface device.

20 Claims, 10 Drawing Sheets

(51) Int. Cl.

| | |
|---|---|
| H04B 17/391 | (2015.01) |
| H04B 7/06 | (2006.01) |
| H04B 7/0456 | (2017.01) |
| H04B 17/318 | (2015.01) |
| H04B 7/0452 | (2017.01) |
| H04B 7/0413 | (2017.01) |
| H04B 7/022 | (2017.01) |
| H04B 7/0417 | (2017.01) |
| H04B 7/08 | (2006.01) |
| H04B 17/30 | (2015.01) |
| H04B 7/0408 | (2017.01) |
| H04B 17/309 | (2015.01) |
| H04B 10/112 | (2013.01) |
| H04B 17/12 | (2015.01) |
| H04B 17/336 | (2015.01) |
| H04B 17/373 | (2015.01) |
| H04W 24/08 | (2009.01) |
| H04B 7/0404 | (2017.01) |
| H04B 7/0426 | (2017.01) |
| H04W 16/28 | (2009.01) |
| H04W 16/22 | (2009.01) |
| H04W 16/14 | (2009.01) |
| H04W 24/02 | (2009.01) |
| H04W 24/10 | (2009.01) |
| H04W 84/12 | (2009.01) |
| H04L 25/02 | (2006.01) |
| G01S 5/02 | (2010.01) |
| G01S 19/22 | (2010.01) |
| G01S 13/87 | (2006.01) |
| G01S 19/42 | (2010.01) |
| H04L 5/00 | (2006.01) |
| H04L 1/00 | (2006.01) |

(52) U.S. Cl.
CPC .......... *G01S 5/0242* (2013.01); *G01S 13/876* (2013.01); *G01S 13/878* (2013.01); *G01S 19/22* (2013.01); *G01S 19/42* (2013.01); *H04B 7/022* (2013.01); *H04B 7/043* (2013.01); *H04B 7/0404* (2013.01); *H04B 7/0408* (2013.01); *H04B 7/0413* (2013.01); *H04B 7/0417* (2013.01); *H04B 7/0452* (2013.01); *H04B 7/0469* (2013.01); *H04B 7/0617* (2013.01); *H04B 7/0626* (2013.01); *H04B 7/0632* (2013.01); *H04B 7/0634* (2013.01); *H04B 7/0639* (2013.01); *H04B 7/0695* (2013.01); *H04B 7/088* (2013.01); *H04B 10/112* (2013.01); *H04B 17/12* (2015.01); *H04B 17/30* (2015.01); *H04B 17/309* (2015.01); *H04B 17/318* (2015.01); *H04B 17/336* (2015.01); *H04B 17/373* (2015.01); *H04B 17/391* (2015.01); *H04B 17/3911* (2015.01); *H04B 17/3912* (2015.01); *H04L 25/0222* (2013.01); *H04W 16/14* (2013.01); *H04W 16/22* (2013.01); *H04W 16/28* (2013.01); *H04W 24/02* (2013.01); *H04W 24/08* (2013.01); *H04W 24/10* (2013.01); *H04W 72/04* (2013.01); *H04W 72/042* (2013.01); *H04W 72/0413* (2013.01); *H04W 72/0453* (2013.01); *H04W 84/12* (2013.01); *H04L 1/0026* (2013.01); *H04L 5/006* (2013.01); *H04L 5/0035* (2013.01); *H04L 25/0204* (2013.01); *Y02D 30/70* (2020.08)

(58) Field of Classification Search
CPC .. H04W 72/0453; H04L 5/0048; H04L 5/001; H04L 5/0053; H04L 25/0222; H04L 1/0026; H04L 25/0204; H04L 25/022; H04L 27/2601; H04L 25/0202; H04L 25/021; H04L 5/0035; H04L 5/0057; H04L 5/006; H04L 1/0668; H04L 27/34; G01S 5/0036; G01S 5/10; G01S 11/06; G01S 5/02; G01S 13/876; G01S 13/878; G01S 5/0027; G01S 5/0215; G01S 5/0226; G01S 19/22; G01S 19/42; G01S 5/0242; Y02D 70/1222; Y02D 70/1262; Y02D 70/1264; Y02D 70/142; Y02D 70/144; Y02D 70/146; Y02D 70/164
See application file for complete search history.

(56) References Cited

U.S. PATENT DOCUMENTS

| | | | |
|---|---|---|---|
| 2008/0252541 A1* | 10/2008 | Diaz ..................... | B33Y 80/00 343/785 |
| 2016/0014613 A1* | 1/2016 | Ponnampalam ...... | H04L 41/145 370/254 |
| 2019/0102493 A1* | 4/2019 | Harrison ............... | H04W 16/22 |
| 2021/0029564 A1* | 1/2021 | Lupper ................. | H04W 24/02 |

* cited by examiner

INTERACTIVE NETWORK PLANNING BASED ON FRESNEL ZONE

TECHNICAL FIELD

The present application relates generally to improved techniques for determining one or more Fresnel zone(s) in a three-dimensional space and, more specifically, to employing the Fresnel zones in connection with interactive network planning.

BACKGROUND

In conventional systems, network planning is typically performed on a server as part of a batch process. Batch process network planning may lack certain advantageous interactive elements such as a rich and intuitive visual representation, real-time or interactive input and/or feedback while in the field and so on. Other systems that are not tied to a server batch process may provide some degree of interactivity, but these systems tend to compute line-of-sight (LoS) without taking into account Fresnel zone in connection with the network planning, which is not as robust or accurate as network planning that does take Fresnel zones into account.

BRIEF DESCRIPTION OF THE DRAWINGS

Numerous aspects, embodiments, objects and advantages of the present application will be apparent upon consideration of the following detailed description, taken in conjunction with the accompanying drawings, in which like reference characters refer to like parts throughout, and in which.

DETAILED DESCRIPTION

Overview

Figure 1:
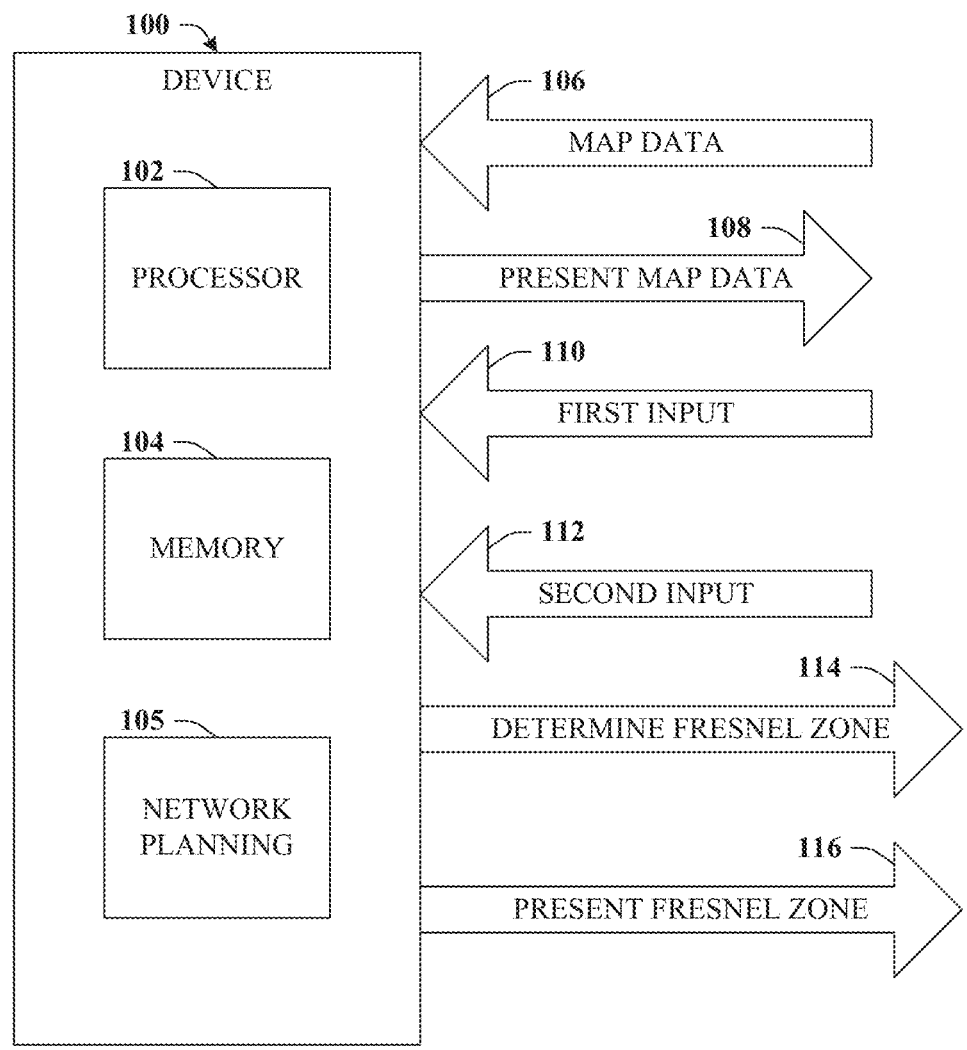
FIG. 1 illustrates a block diagram illustrating an example device that can perform network planning operations or procedures in accordance with certain embodiments of this disclosure.

Radio communication transmissions such as 5G millimeter waves or microwave radio transmissions are affected by obstacles like buildings, trees, and the terrain. In network planning, one potential goal can be to take these obstacles into account when selecting locations for antennas or for receivers and transmitters. A receiver and a transmitter should have a clear line-of-sight (LoS) with one another, to be able to create a radio connection between the two. Furthermore, it can be advantageous to take Fresnel Zones into account when computing the effect of objects near the LoS, that is, examine a buffer around the LoS with a varying radius according to the distance from the receiver and the transmitter.

Currently, selecting locations for receivers and transmitters relies on manual surveys, that is, sending people to inspect potential locations for antennas or for receivers and transmitters, and examine the existence of a LoS between the receiver and transmitter. This is a time-consuming and expensive process, and it does not allow testing of a large number of options, in order to choose the optimal locations. LoS computations were studied extensively. However, they are often executed as a server-side computation or as a non-interactive computation to examine a static setting. Existing methods for network planning do not provide a flexible solution that can fit to a variety of devices, different environments, and taking Fresnel zones into account.

The disclosed subject matter relates to an interactive network planning system or tool that can be accessed via any suitable device at any suitable location, including mobile devices while in the field. The network planning tool can allow testing of a variety of locations, e.g., pairs of locations with a LoS between them. In addition, the network planning tool can test a sequence of locations such that for each adjacent pair of locations there is a LoS between them. The latter can be used to create a transmission chain or the like. Furthermore, the network planning tool can test coverage of an area by a minimum number of antennas and so forth.

In addition to core LoS calculations, the network planning tool can perform robust planning tasks by determining a Fresnel zone between two selected locations and presenting representations thereof. Hence, identification of potential obstructions can be determined from Fresnel zone calculations or determinations rather than from more basic LoS data. For example, an object that intersects some portion of the Fresnel zone can be identified as an obstruction even though that object does not intersect the LoS. Rendered representations of those object(s) that obstruct the Fresnel zone(s) can be highlighted or an indication that there are no obstructions can be presented. Furthermore, potential obstructions can be identified even when those obstructions do not intercept a bottom portion of the Fresnel zone, but instead encroach on a top portion or side portions of the Fresnel zone.

As one example, the network planning tool can be browser-based so potentially any browser-capable device can invoke the network planning tool at potentially any location. In other embodiments, the network planning tool can be an application, which can be ported to, or tailored for, specific devices. Some advantages of a browser-based embodiment are that there is no need to install an application as that solution can work on a variety of devices, including mobile device, while providing access to a large and updateable data set stored at a server. The data on the server can be accessed using rich capabilities of a web browser. Further, no plug-ins or additional software need be required and web server applications can be maintained and regularly updated on the server side in order to take advantage of new technologies and to update the datasets. Such updates can be transparent or seamless to a user and need not require any software update or reinstall or reload of data.

Regardless of the particular implementation, the network planning tool can perform network planning tasks with very high precision. For example, geometric computations with high accuracy applied to high-resolution data can be used to take into account obstacles at a fine granularity. Because the network planning tool can be interactive, dynamic and real-time assessment of a LoS and surrounding areas (e.g., a Fresnel zone) can be resolved. Furthermore, interactive and real-time visualization of spaces between selected locations can allow planners to "play" with the system and test a variety of options while seeing representations of potential locations and obstacles as a 3D scene. The network planning tool can allow users to interactively invoke LoS or Fresnel zone computations between any location to one or more other locations via cursor selection or input over a real-time, 3D canvas of a selected geographic environment that is displayed at any suitable scale or zoom level.

The network planning tool can further allow real-time changes in parameters such as a location (e.g., latitude, longitude, and height) of the transmitters or receivers, transmission direction and tilt, signal frequency, and so forth while seeing the results of changes immediately.

Example Systems

The disclosed subject matter is now described with reference to the drawings, wherein like reference numerals are used to refer to like elements throughout. In the following description, for purposes of explanation, numerous specific details are set forth in order to provide a thorough understanding of the disclosed subject matter. It may be evident, however, that the disclosed subject matter may be practiced without these specific details. In other instances, well-known structures and devices are shown in block diagram form in order to facilitate describing the disclosed subject matter.

Referring now to the drawings, with initial reference to FIG. 1, device 100 is depicted. Device 100 can perform network planning operations or procedures in accordance with certain embodiments of this disclosure. Device 100 can comprise a processor 102 that can be specifically configured to perform a network planning procedure in connection with a physical space and a memory 104 that stores executable instructions that, when executed by the processor, facilitate performance of operations. Device 100 can comprise network planning component 105 that can be specifically tailored to perform network planning operations. Processor 102 can be a hardware processor having structural elements known to exist in connection with processing units or circuits, with various operations of processor 102 being represented by functional elements shown in the drawings herein that can require special-purpose instructions, for example stored in memory 104 and/or network planning component 105. Along with these special-purpose instructions, processor 102 and/or device 100 can be a special-purpose device. Further examples of the memory 104 and processor 102 can be found with reference to FIG. 10. It is to be appreciated that device 100 or computer 1002 can represent a server device of a communications network or a user equipment device and can be used in connection with implementing one or more of the systems, devices, or components shown and described in connection with FIG. 1 and other figures disclosed herein.

Operations performed by device 100 and/or processor 102 can comprise generating or receiving map data as shown at reference numeral 106. This map data can be indicative of a three-dimensional (3D) representation of the physical space. In some embodiments, the map data can be indicative of a 2.5 D or other suitable representation of the physical space. At reference numeral 108 the map data can be presented, e.g., via a user interface (not shown) of device 100 or a user interface of another device. Such can be accomplished by instructing the user interface device to present the map data.

Device 100 can further receive first input, illustrated at reference numeral 110. The first input can represent identification or selection of a first location of the physical space. The first input can be received from various accessory devices (e.g., a mouse) or from a touch-screen user interface device. Likewise, as illustrated at reference numeral 112, second input can be received in a similar or distinct manner. The second input can identify or select a second location of the physical space. For example, coordinates of a cursor or other selection mechanism can be translated to locations of the physical space.

As one example, the first input can represent a first location within the physical space of a first transceiver and the second input can represent a second location, different than the first location, of a second transceiver within the physical space. As used herein, the term "location" is intended to represent a location or coordinate within the physical space of a transceiver site. The transceiver site can be characterized in any suitable manner capable of defining a point or area within a 3D space. As examples, the first location or the second location can be characterized as according to x-, y-, and z-axis inputs or latitude, longitude, and height inputs, etc. As used herein "transceiver" is intended to include a receiver, a transmitter, an antenna, or any suitable device for radio signal communication. It is thus understood that the first input and the second input can represent selected locations for two transceivers that are capable of communicating via radio signals. Associated network planning can be employed to determine various characteristics of those radio signals or effects on communication when transceivers are placed at the selected locations (e.g., the first location and the second location) within the physical space.

Device 100 can further determine a Fresnel zone, as indicated at reference numeral 114. Specifically, device 100 can determine one or more Fresnel zone(s) between the first location and the second location. At reference numeral 116, device 100 can instruct the user device to present a representation of the Fresnel zone(s). Additional detail relating to a Fresnel zone is provided at FIG. 2 and an example representation of a presentation provided by device 100 is provided at FIG. 3.

Figure 2:
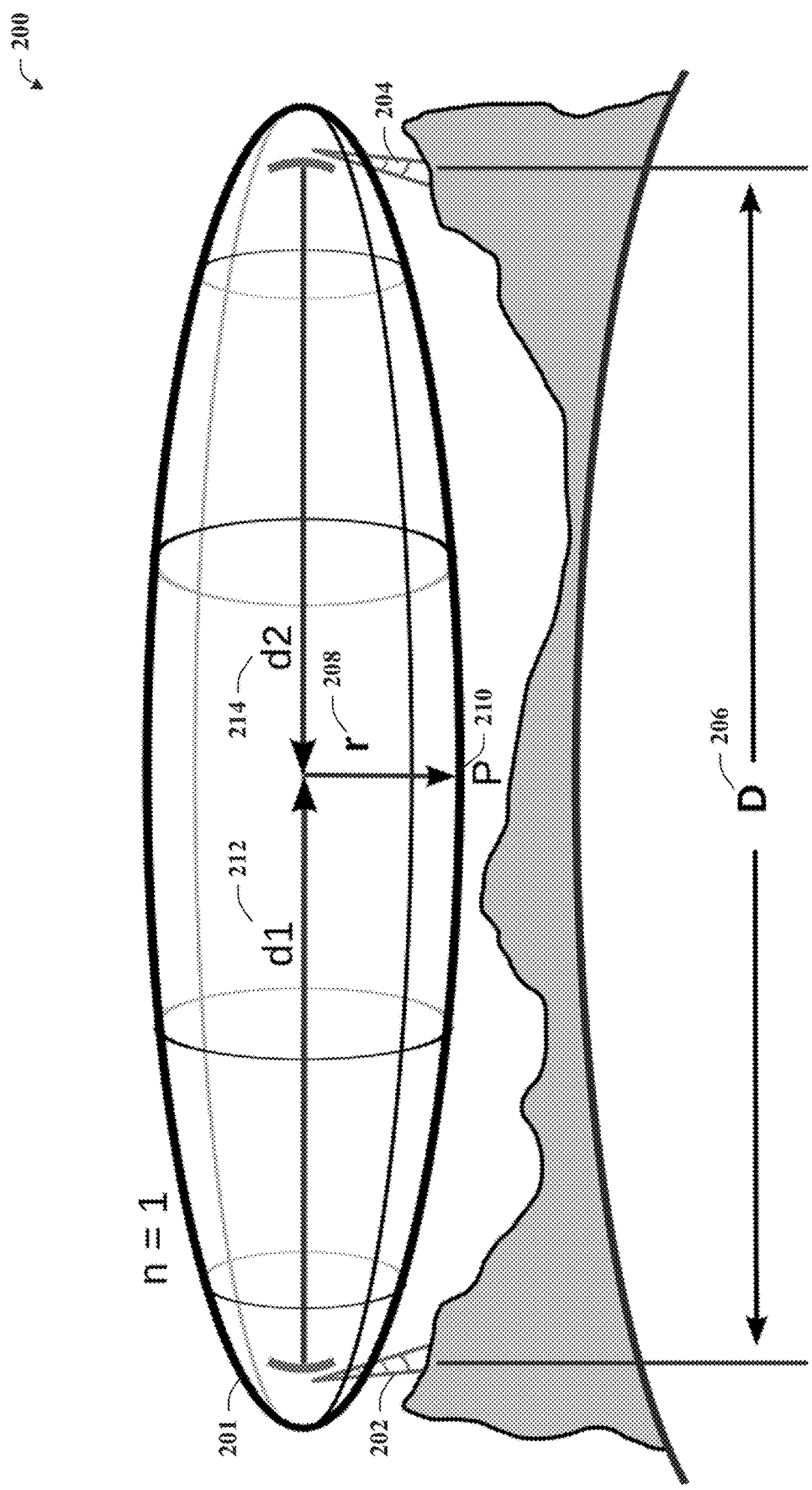
FIG. 2 illustrates a graphical depiction showing an example representation of a Fresnel zone in accordance with certain embodiments of this disclosure.

Turning now to FIG. 2, graphical depiction 200 is illustrated, showing an example representation of Fresnel zone 201 in accordance with certain embodiments of this disclosure. Fresnel zone 201 can represent one in a series of confocal prolate ellipsoidal regions of space between an around two transceivers such as transceivers 202 and 204 situated some D, or distance 206 away from one another. In this case, n=1 indicates that Fresnel zone 201 is the first in the series of Fresnel zones. Transmitted radio waves can follow slightly different paths before reaching a receiver, especially if there are obstructions or reflecting objects between the two. The waves can arrive at slightly different times and can be slightly out of phase due to the different path lengths. Depending on the magnitude of the phase shift, the waves can interfere constructively and destructively. The size of the calculated Fresnel zone at any particular distance from the transmitter and receiver can help to predict whether obstructions or discontinuities along the path will cause significant interference.

Fresnel zone 201 can have a radius that varies according to distances from the two transceivers. For example, at point 210, denoted as P, distance 212 (e.g., d1) away from first transceiver 202 and distance 214 (e.g., d2) away from second transceiver 204 are approximately equal. Thus, at point 210, radius 208 (e.g., r) is at a maximum value. It is appreciated that network planning based on Fresnel zone data can be more accurate and/or more robust than network planning based on LoS data alone.

Figure 3:
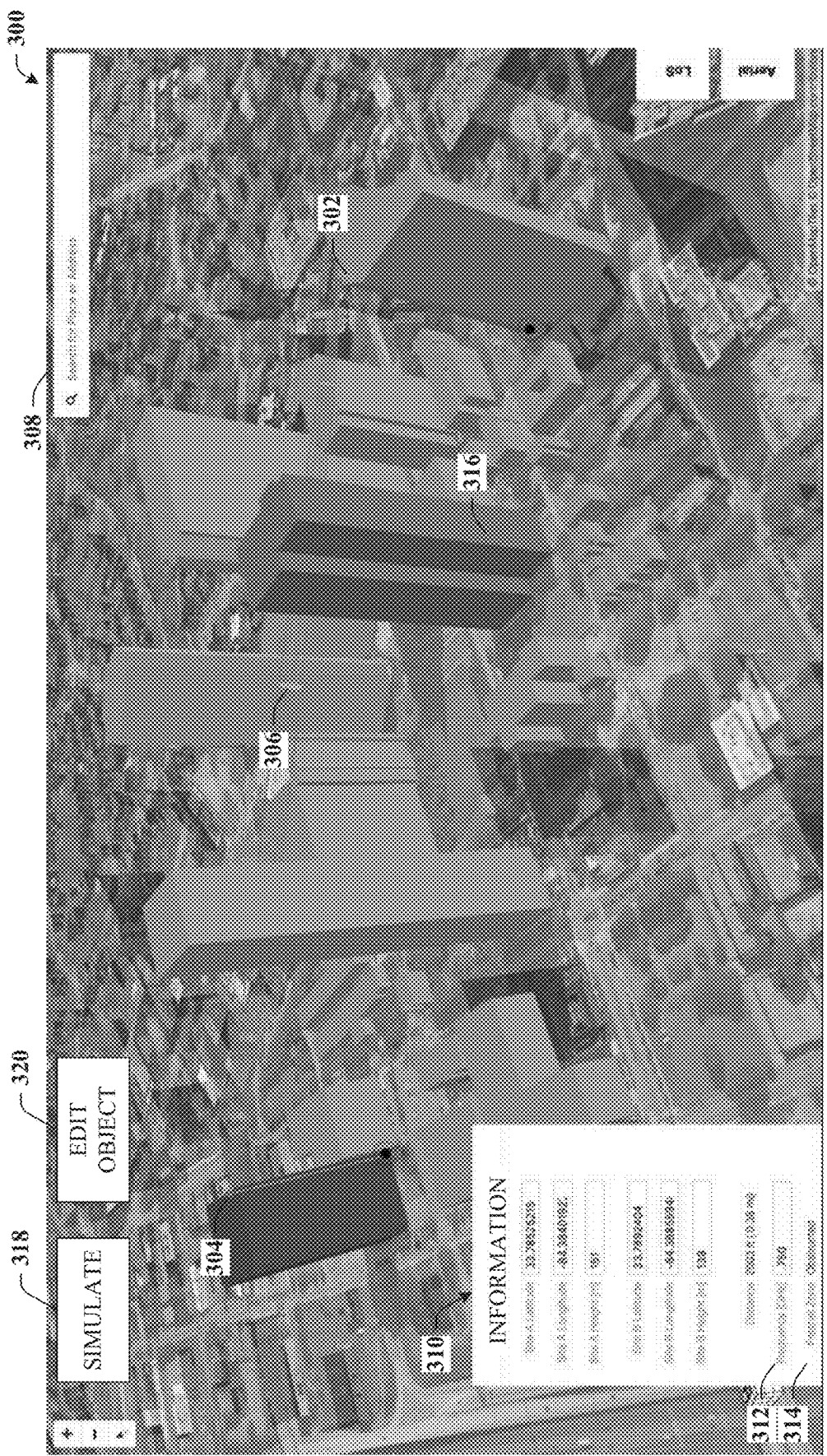
FIG. 3 illustrates a graphical depiction of an example presentation of the device that can be presented to a user interface device in accordance with certain embodiments of this disclosure.

With reference now to FIG. 3, graphical depiction 300 is presented. Graphical depiction 300 can represent an example presentation of device 100 that can be presented to a user interface device in accordance with certain embodiments of this disclosure. Graphical depiction 300 can include region selection element 308. Region selection element 308 can accept input relating to a specified portion of the physical space (e.g., a city or other suitable region). In some embodiments, an initial selection of the physical space can be determined based on a current location of device 100 or another device. Map data relating to those regions of the physical space can be processed to generate the example view of the physical space illustrated in graphical depiction 300.

It is appreciated that the example view is intended to represent a real-time representation of the physical space including terrain, foliage, buildings or other constructions that exist in the physical space. It is further appreciated that various inputs can scroll or pan the representation as well as change the scale or zoom level of the physical space. In this example, in response to first input (e.g., mouse click, screen touch, etc.), first location 302 and second location 304 can be identified and/or selected, which can correspond to transceiver sites. One or more Fresnel zone(s) 306 can be determined and presented.

Graphical depiction 300 can further include information element 310 that can specify (or change in response to input) the selected locations 302, 304, in this case represented as latitude, longitude, and height. Information element 310 can also display a distance (e.g., distance 206) between the selected locations 302, 304.

Figure 4:
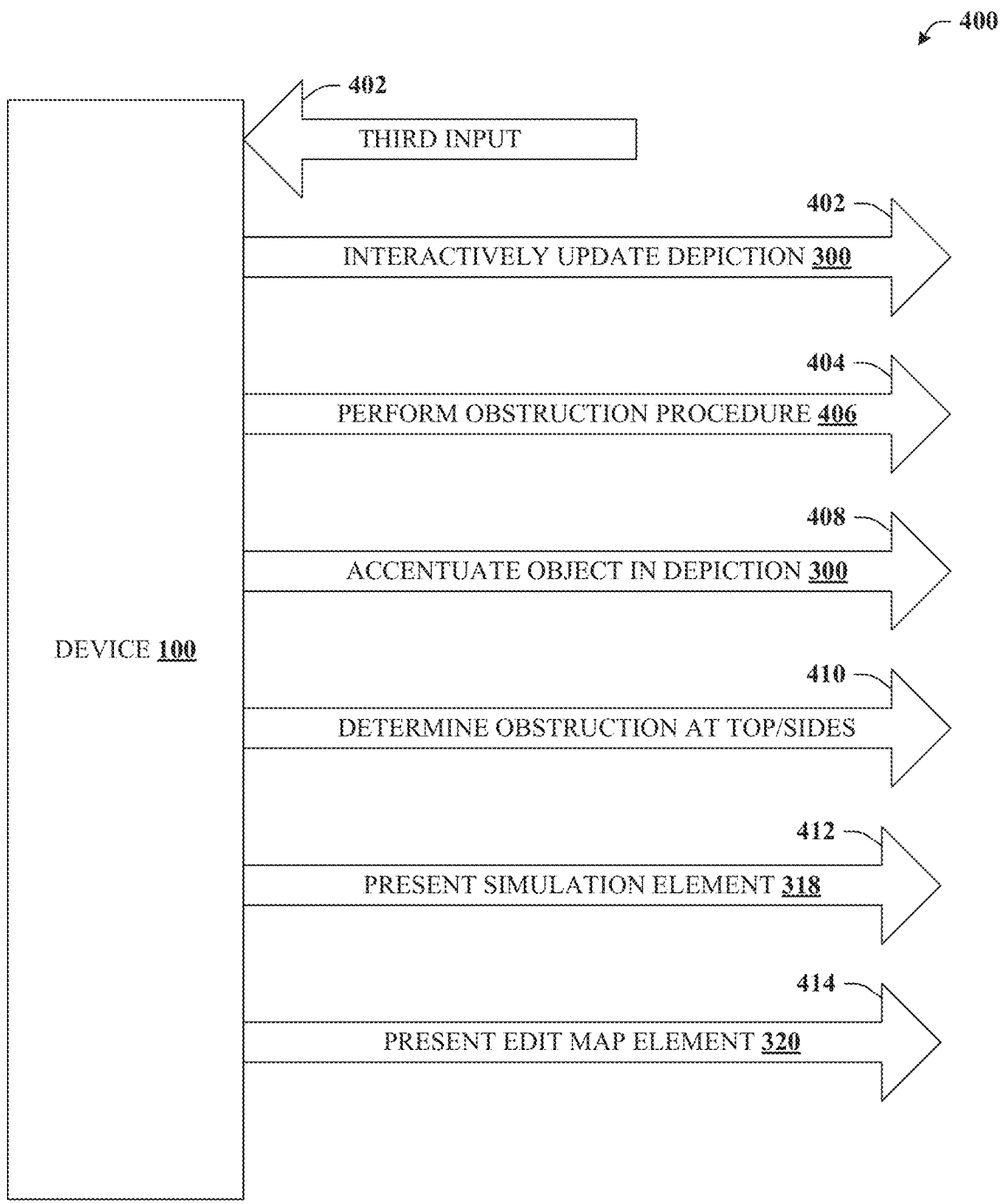
FIG. 4 depicts a block diagram of an example system illustrating additional aspects or elements in connection with the device in accordance with certain embodiments of this disclosure.

While still referring to FIG. 3, but turning as well to FIG. 4, system 400 is presented. System 400 can provide for additional aspects or elements in connection with device 100 in accordance with certain embodiments of this disclosure. For example, in some embodiments, device 100 can further receive third input, which is illustrated at reference numeral 402. The third input can be representative of a signal frequency selected in connection with the network planning procedure introduced in connection with FIG. 1. Reference numeral 312 of FIG. 3 illustrates an example of third input, where the signal frequency selected is 0.75 GHz. In some embodiments, Fresnel zone 306 can be determined as a function of the third input. For example, in some embodiments, an area (or radius) of a cross-section of Fresnel zone 306 can be determined as a function of the signal frequency (e.g., input 312).

At reference numeral 402, device 100 can interactively update graphical depiction 300. For example, the interactive update can be to the map data being displayed in response to changes to the region being displayed or changes to a perspective of the view. As another example, the interactive update can be to Fresnel zone 306 in response to changes to any of a group comprising the first location 302, the second location 304 or the signal frequency 312.

At reference numeral 404, device 100 can perform an obstruction procedure 406. Obstruction procedure 406 can determine whether Fresnel zone 306 is likely to be obstructed by an object (e.g., foliage, terrain, buildings, bridges, or other constructions) in the physical space. Such can be determined based on the map data, which can comprise data regarding such objects and that can be used to present graphical representations of those objects in graphical depiction 300, as illustrated at FIG. 3.

Information element 310 of FIG. 3 can provide results of obstruction procedure 406. For example, element 314 can indicate whether or not Fresnel zone 306 is obstructed. In the event obstruction procedure 406 determines an object does obstruct or is likely to obstruct Fresnel zone 306, device 100 can interactively update graphical depiction 300. For example, as illustrated at reference numeral 408, device 100 can update graphical depiction 300 to accentuate the representation(s) of one or more objects that are determined to cause the obstruction to Fresnel zone 306. For instance, graphical depiction 300 can be updated to highlight the representation of building 316, to render the representation of building 316 in a defined color (e.g., red) or accentuate in another suitable manner.

At reference numeral 410, as part of obstruction procedure 406, device 100 can determine whether an obstruction potentially obstructs Fresnel zone 306 at a top portion or a side portion of Fresnel zone 306, which is discussed in more detail with reference to FIG. 5.

At reference numeral 412, device 100 can present simulation element 318. In response to input to simulation element 318, device 100 can update relevant map data (and associated representations in graphical depiction 300) to reflect the physical space at a different time. As one example, the physical space can be updated to represent the physical space at a different time of year (e g, summer vs. winter, etc.). Such updates can be based on models of plant or foliage growth, based on construction or demolition schedules or the like. It is appreciated that foliage or tree spreads tend to increase during some times of the year and decrease at other times. Hence, simulation element 318 can be employed to more accurately determine or account for potential obstructions that might arise at a future time. Likewise, a similar determination can be made with respect to known erection or demolition of certain constructions to be carried out or completed at a future time.

At reference numeral 414, device 100 can present edit map element 320. In response to input to edit map element 320, device 100 can perform a map editing procedure. During the map editing procedure, input can be received that defines or indicates changes to objects in the physical space that are being represented in graphical depiction 300. For example, a tree might be edited to represent specified pruning or the dimensions of a building might be edited. Thereafter, obstruction procedure 406 can be performed again with the edited map data and results provided.

Figure 5:
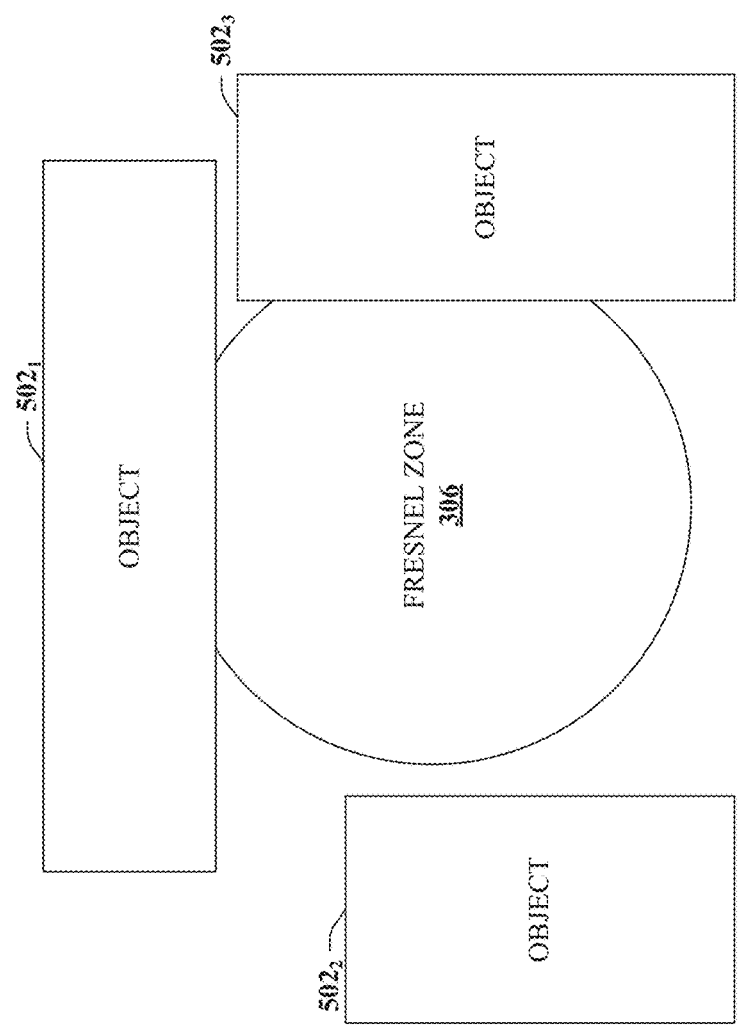
FIG. 5 depicts a cross-section view of an example Fresnel zone and corresponding objects that may cause obstructions in accordance with certain embodiments of this disclosure.

Referring now to FIG. 5, depiction 500 is presented. Depiction 500 illustrates a cross-section view of an example Fresnel zone and corresponding objects that may cause obstructions in accordance with certain embodiments of this disclosure. As noted at during discussion of FIG. 4, device 100 can determine whether objects in the physical space are likely to obstruct Fresnel zone 306 and, particularly, potential obstructions that might obstruct Fresnel zone 306 at a top or side portions. Other systems, such as network planning systems that are performed on a server as part of a batch process (e.g., not interactive) may use Fresnel zone computations. However, these systems tend to only identify obstructions to a bottom portion of the given Fresnel zone.

In addition to identifying potential obstructions to a bottom portion of Fresnel zone 306, device 100 can further identify potential obstructions at other portions of Fresnel zone 306. For example, consider a suspension bridge or other object $502_1$ that clips a top portion of Fresnel zone 306. Further consider the case where Fresnel zone 306 passes between two tall buildings, exemplified by objects $502_2$ and $502_3$. Other systems, such as systems that only identify potential obstructions at a bottom portion of the Fresnel zone may fail to identify objects $502_1$ and $502_3$ as potential obstructions that may lead to interference between the two transceivers. In contrast, the disclosed device can identify potential obstructions that potentially obstruct Fresnel zone 306 at a top portion or a side portion of Fresnel zone 306.

Example Methods

Figure 6:
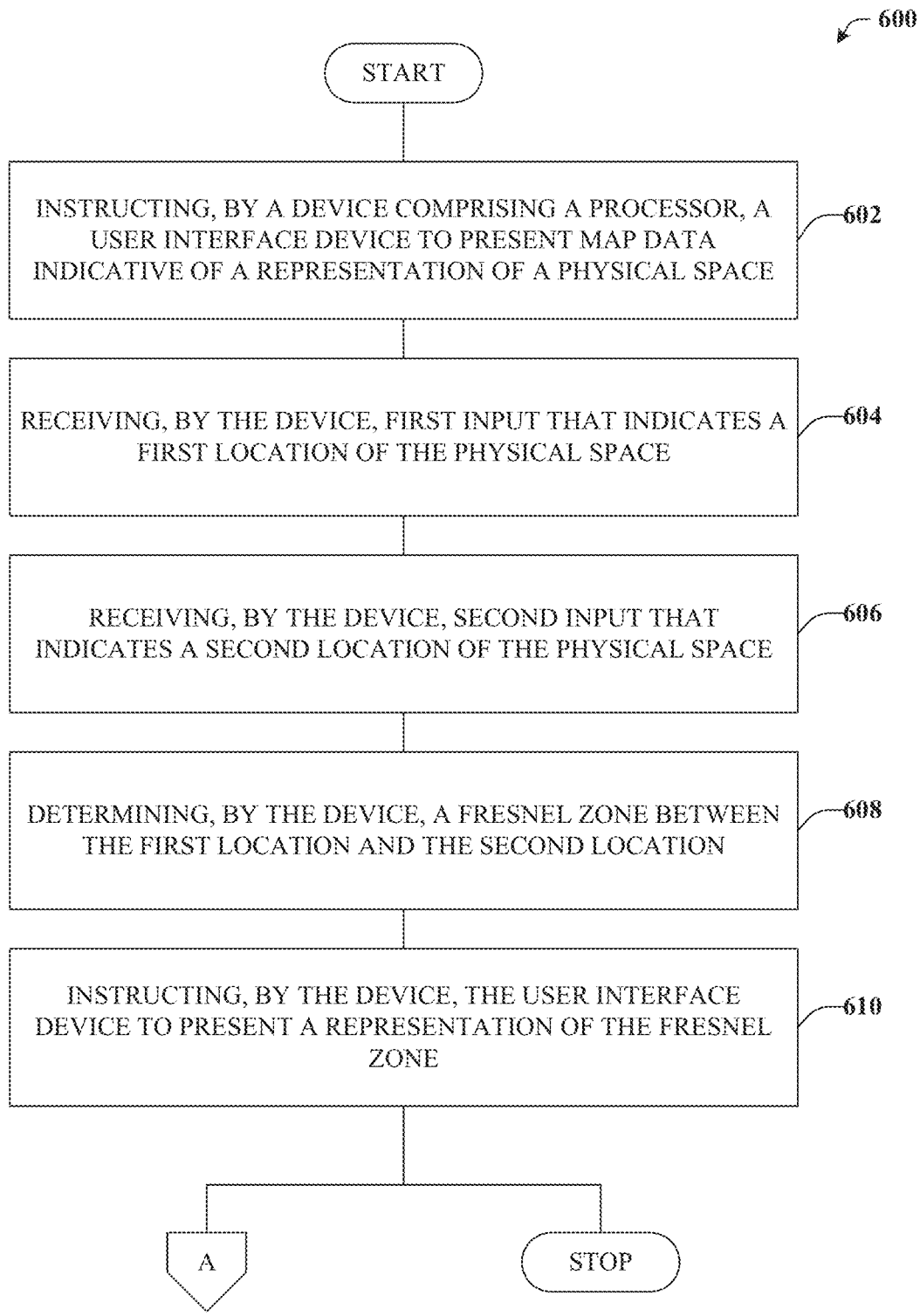
FIG. 6 illustrates an example methodology that can perform a network planning procedure in accordance with certain embodiments of this disclosure.
Figure 7:
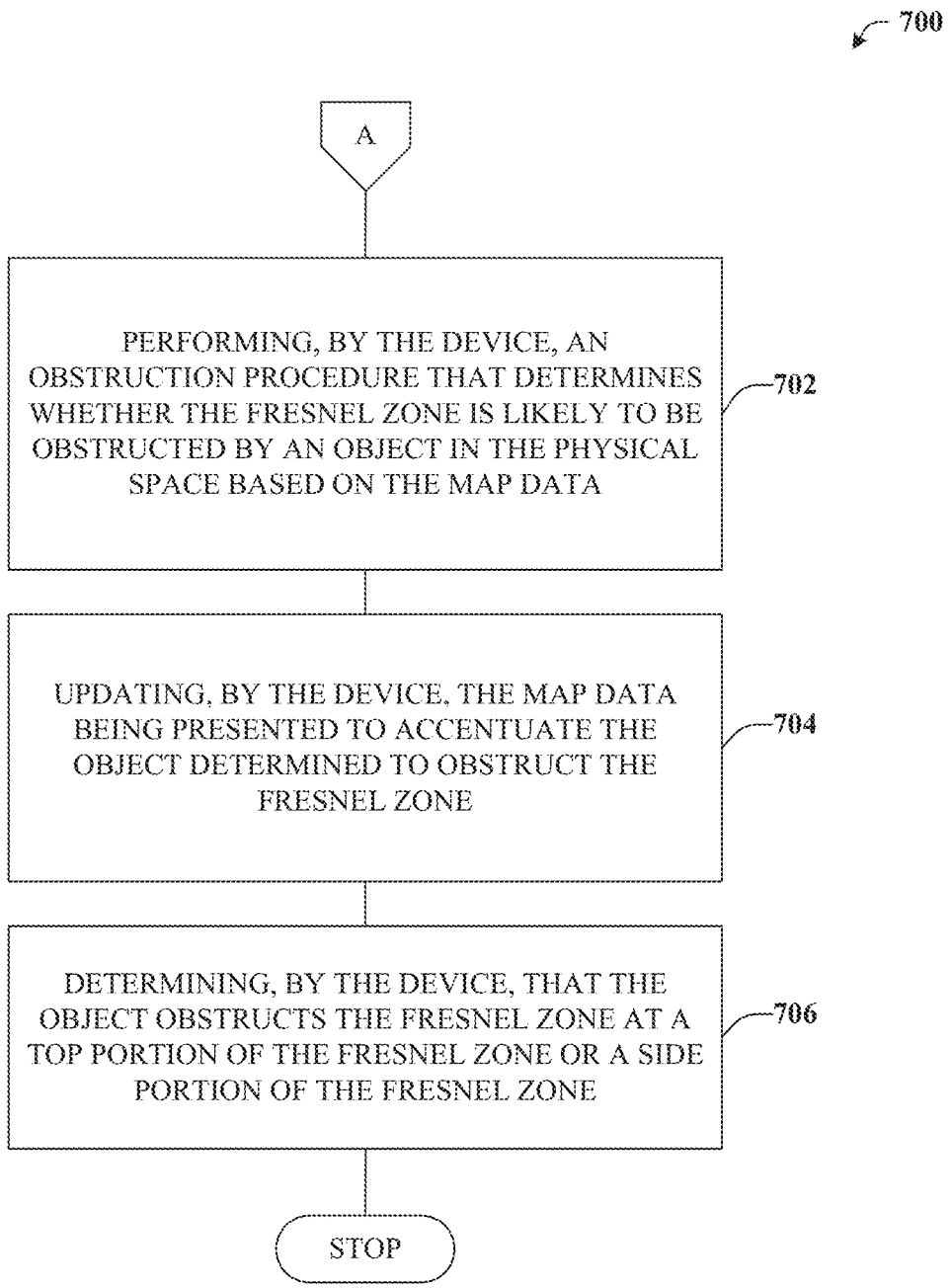
FIG. 7 illustrates an example methodology that can provide for additional elements or aspects in connection with performing a network planning procedure in accordance with certain embodiments of this disclosure.

FIGS. 6 and 7 illustrate various methodologies in accordance with the disclosed subject matter. While, for purposes of simplicity of explanation, the methodologies are shown and described as a series of acts, it is to be understood and appreciated that the disclosed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the disclosed subject matter. Additionally, it should be further appreciated that the methodologies disclosed hereinafter and throughout this specification are capable of being stored on an article of manufacture to facilitate transporting and transferring such methodologies to computers.

Turning now to FIG. 6, exemplary method 600 is depicted. Method 600 can perform a network planning procedure in accordance with certain embodiments of this disclosure. For example, at reference numeral 602, a device comprising a processor can instruct a user interface device to present map data indicative of a 3D representation of a physical space. The 3D representation can have representations of terrain or construction features indicating a real-time representation of the physical space.

At reference numeral 604, the device can receive first input that indicates a first location of the physical space. At reference numeral 606, the device can receive second input that indicates a second location, different from the first location, of the physical space. The first location and the second location can represent transceiver site locations that communicate with one another. In some embodiments, the first location and the second location can represent two in a series of transceiver locations that are daisy chained sequentially.

At reference numeral 608, the device can determine a Fresnel zone between the first location and the second location. At reference numeral 610, the device can instruct the user interface device to present a representation of the Fresnel zone. Method 600 can stop or proceed to insert A, which is further detailed in connection with FIG. 7.

With reference now to FIG. 7, exemplary method 700 is illustrated. Method 700 can provide for additional elements or aspects in connection with performing a network planning procedure in accordance with certain embodiments of this disclosure. For example, at reference numeral 702, the device can perform an obstruction procedure that determines whether the Fresnel zone is likely to be obstructed by an object in the physical space based on the map data.

At reference numeral 704, the device can update a presentation the map data being presented to accentuate the object determined to obstruct the Fresnel zone. In some embodiments, the device can update the presentation in other ways such as to change a perspective or a region of the physical space being represented or to change locations of the first location or the second location. At reference numeral 706, the device can, for example, as part of the obstruction procedure, determine that the object obstructs the Fresnel zone at a top portion of the Fresnel zone or a side portion of the Fresnel zone.

Example Operating Environments

Figure 8:
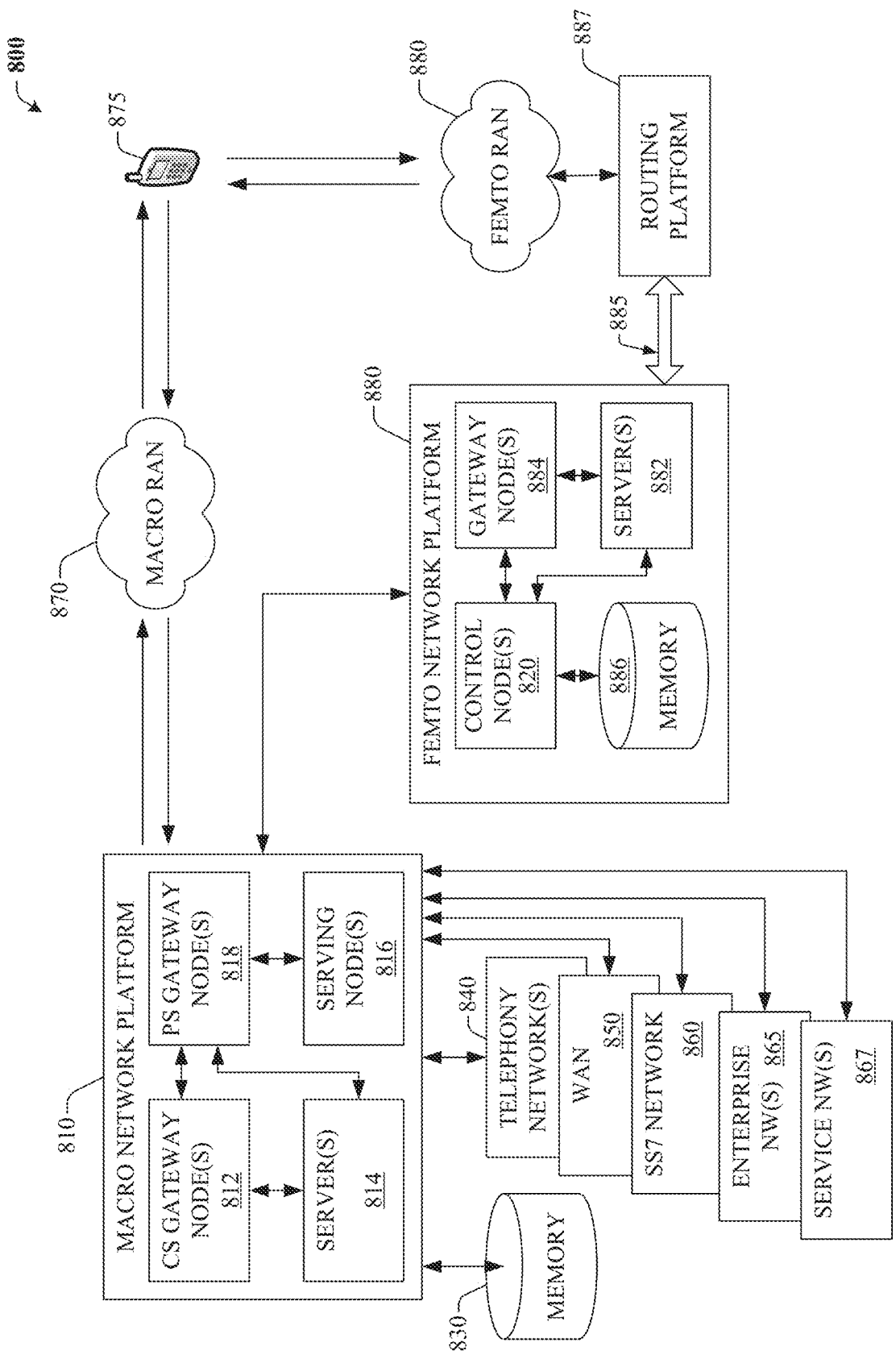
FIG. 8 illustrates a first example of a wireless communications environment with associated components that can be operable to execute certain embodiments of this disclosure.

To provide further context for various aspects of the subject specification, FIG. 8 illustrates an example wireless communication environment 800, with associated components that can enable operation of a femtocell enterprise network in accordance with aspects described herein. Wireless communication environment 800 comprises two wireless network platforms: (i) A macro network platform 810 that serves, or facilitates communication with, user equipment 875 via a macro radio access network (RAN) 870. It should be appreciated that in cellular wireless technologies (e.g., 4G, 3GPP UMTS, HSPA, 3GPP LTE, 3GPP UMB, 5G), macro network platform 810 is embodied in a Core Network. (ii) A femto network platform 880, which can provide communication with UE 875 through a femto RAN 890, linked to the femto network platform 880 through a routing platform 887 via backhaul pipe(s) 885. It should be appreciated that femto network platform 880 typically off-loads UE 875 from macro network, once UE 875 attaches (e.g., through macro-to-femto handover, or via a scan of channel resources in idle mode) to femto RAN.

It is noted that RAN comprises base station(s), or access point(s), and its associated electronic circuitry and deployment site(s), in addition to a wireless radio link operated in accordance with the base station(s). Accordingly, macro RAN1370 can comprise various coverage cells, while femto RAN 890 can comprise multiple femto access points or multiple metro cell access points. As mentioned above, it is to be appreciated that deployment density in femto RAN 890 can be substantially higher than in macro RAN 870.

Generally, both macro and femto network platforms 810 and 880 comprise components, e.g., nodes, gateways, interfaces, servers, or platforms, that facilitate both packet-switched (PS) (e.g., internet protocol (IP), Ethernet, frame relay, asynchronous transfer mode (ATM)) and circuit-switched (CS) traffic (e.g., voice and data) and control generation for networked wireless communication. In an aspect of the subject innovation, macro network platform 810 comprises CS gateway node(s) 812 which can interface CS traffic received from legacy networks like telephony network(s) 840 (e.g., public switched telephone network (PSTN), or public land mobile network (PLMN)) or a SS7 network 860. Circuit switched gateway 812 can authorize and authenticate traffic (e.g., voice) arising from such networks. Additionally, CS gateway 812 can access mobility, or roaming, data generated through SS7 network 860; for instance, mobility data stored in a VLR, which can reside in memory 830. Moreover, CS gateway node(s) 812 interfaces CS-based traffic and signaling and gateway node(s) 818. As an example, in a 3GPP UMTS network, gateway node(s) 818 can be embodied in gateway GPRS support node(s) (GGSN).

In addition to receiving and processing CS-switched traffic and signaling, gateway node(s) 818 can authorize and authenticate PS-based data sessions with served (e.g., through macro RAN) wireless devices. Data sessions can comprise traffic exchange with networks external to the macro network platform 810, like wide area network(s) (WANs) 850; it should be appreciated that local area network(s) (LANs) can also be interfaced with macro network platform 810 through gateway node(s) 818. Gateway node(s) 818 generates packet data contexts when a data session is established. To that end, in an aspect, gateway node(s) 818 can comprise a tunnel interface (e.g., tunnel termination gateway (TTG) in 3GPP UMTS network(s); not shown) which can facilitate packetized communication with disparate wireless network(s), such as Wi-Fi networks. It should be further appreciated that the packetized communication can comprise multiple flows that can be generated through server(s) 814. It is to be noted that in 3GPP UMTS network(s), gateway node(s)1318 (e.g., GGSN) and tunnel interface (e.g., TTG) comprise a packet data gateway (PDG).

Macro network platform 810 also comprises serving node(s) 816 that convey the various packetized flows of information or data streams, received through gateway node(s) 818. As an example, in a 3GPP UMTS network, serving node(s) can be embodied in serving GPRS support node(s) (SGSN).

As indicated above, server(s) 814 in macro network platform 810 can execute numerous applications (e.g., location services, online gaming, wireless banking, wireless device management . . . ) that generate multiple disparate packetized data streams or flows, and manage (e.g., schedule, queue, format . . . ) such flows. Such application(s), for example can comprise add-on features to standard services provided by macro network platform 810. Data streams can be conveyed to gateway node(s) 818 for authorization/authentication and initiation of a data session, and to serving node(s) 816 for communication thereafter. Server(s) 814 can also effect security (e.g., implement one or more firewalls) of macro network platform 810 to ensure network's operation and data integrity in addition to authorization and authentication procedures that CS gateway node(s) 812 and gateway node(s) 818 can enact. Moreover, server(s) 814 can provision services from external network(s), e.g., WAN 850, or Global Positioning System (GPS) network(s) (not shown). It is to be noted that server(s) 814 can comprise one or more processor configured to confer at least in part the functionality of macro network platform 810. To that end, the one or more processor can execute code instructions stored in memory 830, for example.

In example wireless environment 800, memory 830 stores information related to operation of macro network platform 810. Information can comprise business data associated with subscribers; market plans and strategies, e.g., promotional campaigns, business partnerships; operational data for mobile devices served through macro network platform; service and privacy policies; end-user service logs for law enforcement; and so forth. Memory 830 can also store information from at least one of telephony network(s) 840, WAN(s) 850, or SS7 network 860, enterprise NW(s) 865, or service NW(s) 867.

Femto gateway node(s) 884 have substantially the same functionality as PS gateway node(s) 818. Additionally, femto gateway node(s) 884 can also comprise substantially all functionality of serving node(s) 816. In an aspect, femto gateway node(s) 884 facilitates handover resolution, e.g., assessment and execution. Further, control node(s) 820 can receive handover requests and relay them to a handover component (not shown) via gateway node(s) 884. According to an aspect, control node(s) 820 can support RNC capabilities.

Server(s) 882 have substantially the same functionality as described in connection with server(s) 814. In an aspect, server(s) 882 can execute multiple application(s) that provide service (e.g., voice and data) to wireless devices served through femto RAN 890. Server(s) 882 can also provide security features to femto network platform. In addition, server(s) 882 can manage (e.g., schedule, queue, format . . . ) substantially all packetized flows (e.g., IP-based) it generates in addition to data received from macro network platform 810. It is to be noted that server(s) 882 can comprise one or more processor configured to confer at least in part the functionality of macro network platform 810. To that end, the one or more processor can execute code instructions stored in memory 886, for example.

Memory 886 can comprise information relevant to operation of the various components of femto network platform 880. For example, operational information that can be stored in memory 886 can comprise, but is not limited to, subscriber information; contracted services; maintenance and service records; femto cell configuration (e.g., devices served through femto RAN 890; access control lists, or white lists); service policies and specifications; privacy policies; add-on features; and so forth.

It is noted that femto network platform 880 and macro network platform 810 can be functionally connected through one or more reference link(s) or reference interface(s). In addition, femto network platform 880 can be functionally coupled directly (not illustrated) to one or more of external network(s) 840, 850, 860, 865 or 867. Reference link(s) or interface(s) can functionally link at least one of gateway node(s) 884 or server(s) 886 to the one or more external networks 840, 850, 860, 865 or 867.

Figure 9:
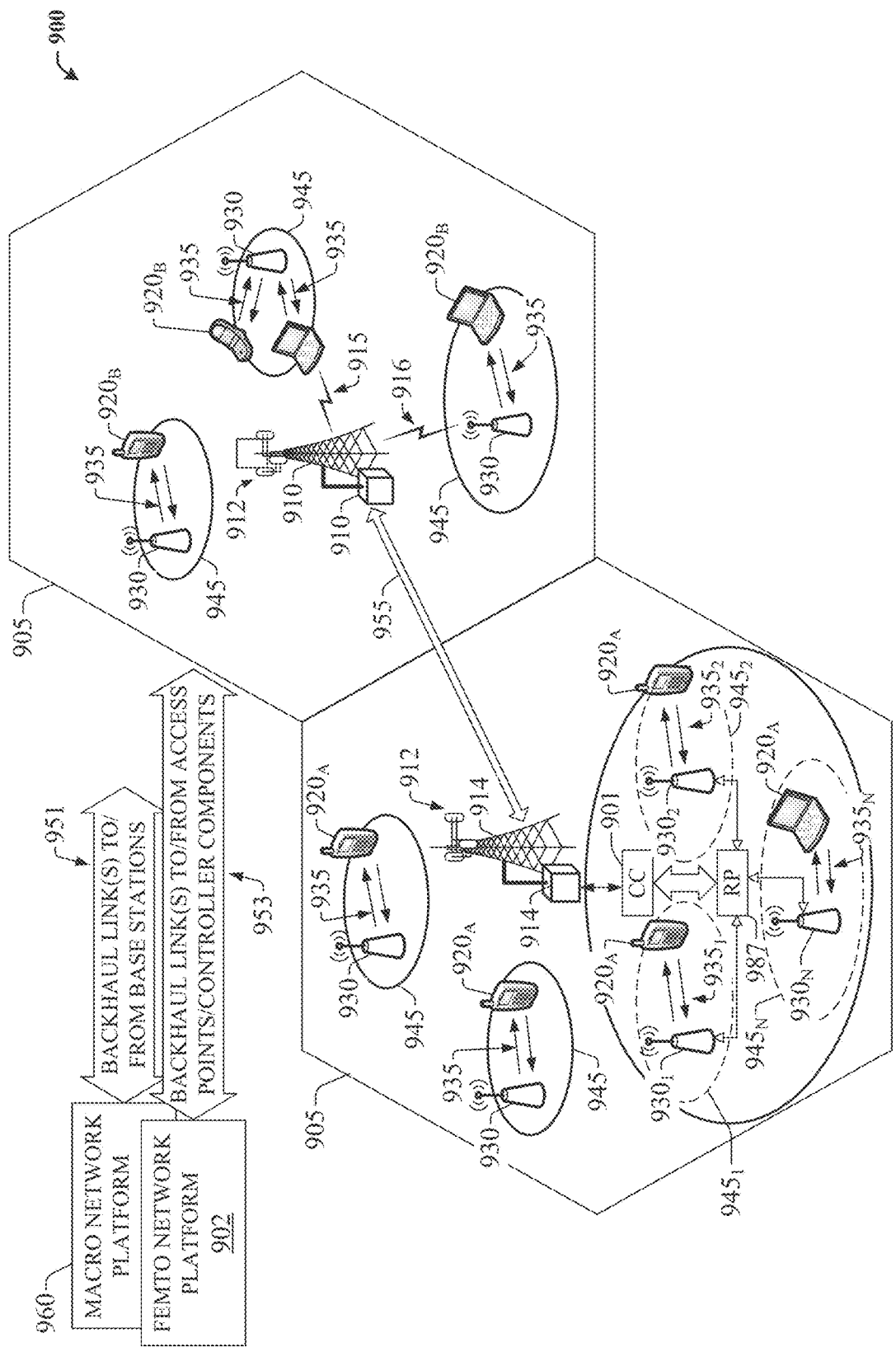
FIG. 9 illustrates a second example of a wireless communications environment with associated components that can be operable to execute certain embodiments of this disclosure.

FIG. 9 illustrates a wireless environment that comprises macro cells and femtocells for wireless coverage in accordance with aspects described herein. In wireless environment 905, two areas represent "macro" cell coverage; each macro cell is served by a base station 910. It can be appreciated that macro cell coverage area 905 and base station 910 can comprise functionality, as more fully described herein, for example, with regard to system 900. Macro coverage is generally intended to serve mobile wireless devices, like UE $920_A$, $920_B$, in outdoors locations. An over-the-air (OTA) wireless link 935 provides such coverage, the wireless link 935 comprises a downlink (DL) and an uplink (UL), and utilizes a predetermined band, licensed or unlicensed, of the radio frequency (RF) spectrum. As an example, UE $920_A$, $920_B$ can be a 3GPP Universal Mobile Telecommunication System (UMTS) mobile phone. It is noted that a set of base stations, its associated electronics, circuitry or components, base stations control component(s), and wireless links operated in accordance to respective base stations in the set of base stations form a radio access network (RAN). In addition, base station 910 communicates via backhaul link(s) 951 with a macro network platform 960, which in cellular wireless technologies (e.g., 3rd Generation Partnership Project (3GPP) Universal Mobile Telecommunication System (UMTS), Global System for Mobile Communication (GSM)) represents a core network.

In an aspect, macro network platform 960 controls a set of base stations 910 that serve either respective cells or a number of sectors within such cells. Base station 910 comprises radio equipment 914 for operation in one or more radio technologies, and a set of antennas 912 (e.g., smart antennas, microwave antennas, satellite dish(es) . . . ) that can serve one or more sectors within a macro cell 905. It is noted that a set of radio network control node(s), which can be a part of macro network platform 960; a set of base stations (e.g., Node B 910) that serve a set of macro cells 905; electronics, circuitry or components associated with the base stations in the set of base stations; a set of respective OTA wireless links (e.g., links 915 or 916) operated in accordance to a radio technology through the base stations; and backhaul link(s) 955 and 951 form a macro radio access network (RAN). Macro network platform 960 also communicates with other base stations (not shown) that serve other cells (not shown). Backhaul link(s) 951 or 953 can comprise a wired backbone link (e.g., optical fiber backbone, twisted-pair line, T1/E1 phone line, a digital subscriber line (DSL) either synchronous or asynchronous, an asymmetric ADSL, or a coaxial cable . . . ) or a wireless (e.g., LoS) or non-LoS) backbone link. Backhaul pipe(s) 955 link disparate base stations 910. According to an aspect, backhaul link 953 can connect multiple femto access points 930 and/or controller components (CC) 901 to the femto network platform 902. In one example, multiple femto APs can be connected to a routing platform (RP) 987, which in turn can be connect to a controller component (CC) 901. Typically, the information from UEs $920_A$ can be routed by the RP 987, for example, internally, to another UE $920_A$ connected to a disparate femto AP connected to the RP 987, or, externally, to the femto network platform 902 via the CC 901, as discussed in detail supra.

In wireless environment 905, within one or more macro cell(s) 905, a set of femtocells 945 served by respective femto access points (APs) 930 can be deployed. It can be appreciated that, aspects of the subject innovation can be geared to femtocell deployments with substantive femto AP density, e.g., $9^4$-$10^7$ femto APs 930 per base station 910. According to an aspect, a set of femto access points $930_1$-$930_N$, with N a natural number, can be functionally connected to a routing platform 987, which can be functionally coupled to a controller component 901. The controller component 901 can be operationally linked to the femto network platform 902 by employing backhaul link(s) 953. Accordingly, UE $920_A$ connected to femto APs $930_1$-$930_N$ can communicate internally within the femto enterprise via the routing platform (RP) 987 and/or can also communicate with the femto network platform 902 via the RP 987, controller component 901 and the backhaul link(s) 953. It can be appreciated that although only one femto enterprise is depicted in FIG. 9, multiple femto enterprise networks can be deployed within a macro cell 905.

It is noted that while various aspects, features, or advantages described herein have been illustrated through femto access point(s) and associated femto coverage, such aspects and features also can be exploited for home access point(s) (HAPs) that provide wireless coverage through substantially any, or any, disparate telecommunication technologies, such as for example Wi-Fi (wireless fidelity) or picocell telecommunication. Additionally, aspects, features, or advantages of the subject innovation can be exploited in substantially any wireless telecommunication, or radio, technology; for example, Wi-Fi, Worldwide Interoperability for Microwave Access (WiMAX), Enhanced General Packet Radio Service (Enhanced GPRS), 3GPP LTE, 3GPP2 UMB, 3GPP UMTS, HSPA, HSDPA, HSUPA, or LTE Advanced. Moreover, substantially all aspects of the subject innovation can comprise legacy telecommunication technologies.

With respect to FIG. 9, in example embodiment 900, base station AP 910 can receive and transmit signal(s) (e.g., traffic and control signals) from and to wireless devices, access terminals, wireless ports and routers, etc., through a set of antennas $912_1$-$912_N$. It should be appreciated that while antennas $912_1$-$912_N$ are a part of communication platform 925, which comprises electronic components and associated circuitry that provides for processing and manipulating of received signal(s) (e.g., a packet flow) and signal(s) (e.g., a broadcast control channel) to be transmitted. In an aspect, communication platform 925 comprises a transmitter/receiver (e.g., a transceiver) 966 that can convert signal(s) from analog format to digital format upon reception, and from digital format to analog format upon transmission. In addition, receiver/transmitter 966 can divide a single data stream into multiple, parallel data streams, or perform the reciprocal operation. Coupled to transceiver 966 is a multiplexer/demultiplexer 967 that facilitates manipulation of signal in time and frequency space. Electronic component 967 can multiplex information (data/traffic and control/signaling) according to various multiplexing schemes such as time division multiplexing (TDM), frequency division multiplexing (FUM), orthogonal frequency division multiplexing (OFDM), code division multiplexing (CDM), space division multiplexing (SDM). In addition, mux/demux component 967 can scramble and spread information (e.g., codes) according to substantially any code known in the art; e.g., Hadamard-Walsh codes, Baker codes, Kasami codes, polyphase codes, and so on. A modulator/demodulator 968 is also a part of operational group 925, and can modulate information according to multiple modulation techniques, such as frequency modulation, amplitude modulation (e.g., M-ary quadrature amplitude modulation (QAM), with M a positive integer), phase-shift keying (PSK), and the like.

Figure 10:
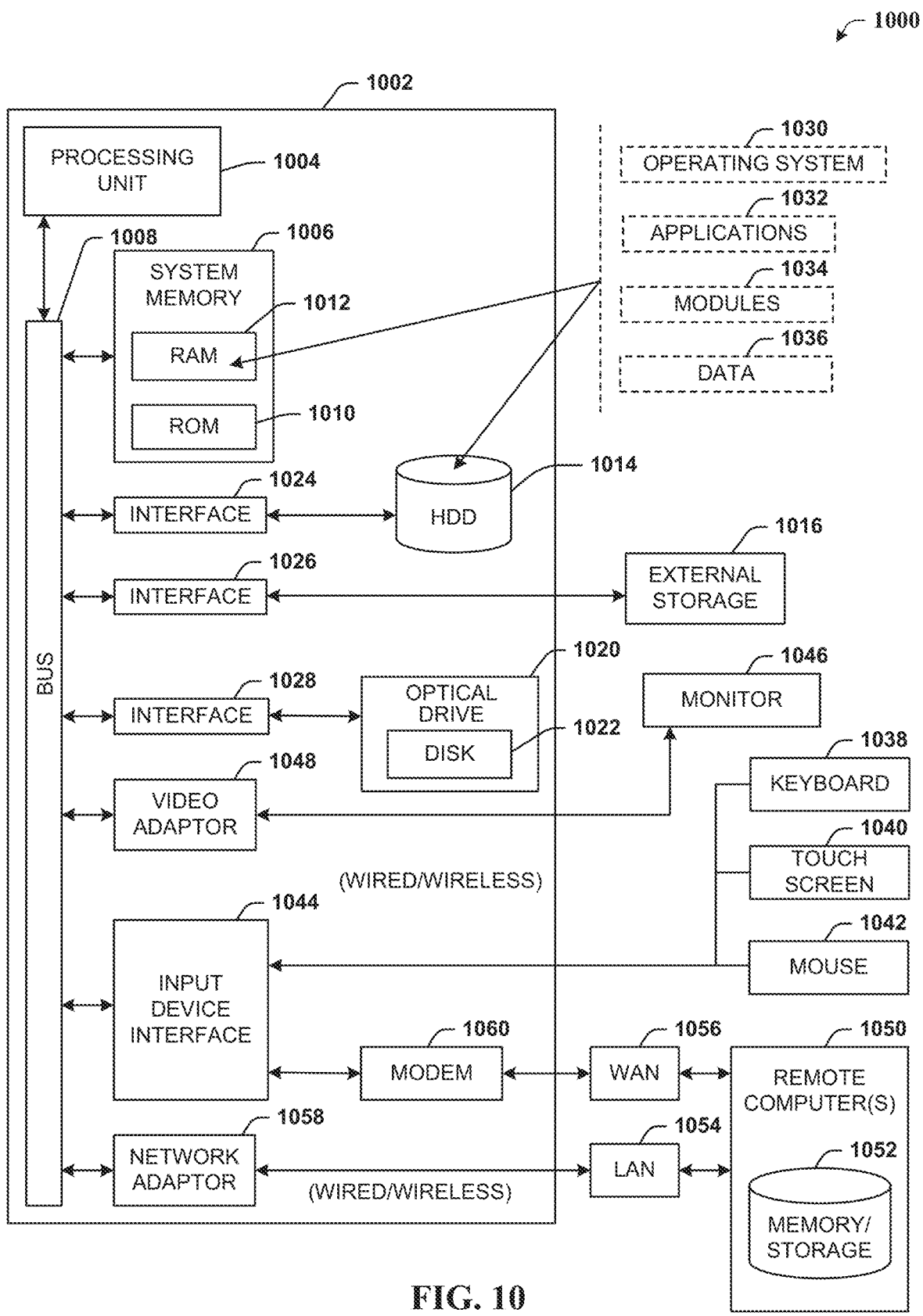
FIG. 10 illustrates an example block diagram of a computer operable to execute certain embodiments of this disclosure.

Referring now to FIG. 10, there is illustrated a block diagram of an exemplary computer system operable to execute the disclosed architecture. In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1094 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For instance with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

The computer 1002 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This comprises at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 11 Mbps (802.11b) or 54 Mbps (802.11a) data rate, for example, or with products that contain both bands (dual band), so the networks can provide real-world performance similar to the basic "10BaseT" wired Ethernet networks used in many offices.

What has been described above comprises examples of the various embodiments. It is, of course, not possible to describe every conceivable combination of components or methodologies for purposes of describing the embodiments, but one of ordinary skill in the art may recognize that many further combinations and permutations are possible. Accordingly, the detailed description is intended to embrace all such alterations, modifications, and variations that fall within the spirit and scope of the appended claims.

As used in this application, the terms "system," "component," "interface," and the like are generally intended to refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. These components also can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry that is operated by software or firmware application(s) executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. An interface can comprise input/output (I/O) components as well as associated processor, application, and/or API components.

Furthermore, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from by a computing device.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory. In addition, memory components or memory elements can be removable or stationary. Moreover, memory can be internal or external to a device or component, or removable or stationary. Memory can comprise various types of media that are readable by a computer, such as hard-disc drives, zip drives, magnetic cassettes, flash memory cards or other types of memory cards, cartridges, or the like.

By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In this regard, it will also be recognized that the embodiments comprise a system as well as a computer-readable medium having computer-executable instructions for performing the acts and/or events of the various methods.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communications media comprise wired media, such as a wired network or direct-wired connection, and wireless media such as acoustic, RF, infrared and other wireless media.

Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

What is claimed is:

1. A user equipment, comprising:
a processor configured to perform a network planning procedure in connection with a physical space comprising the user equipment; and
a memory that stores executable instructions that, when executed by the processor, facilitate performance of operations, comprising:
instructing a user interface device to present map data indicative of a three-dimensional representation of the physical space;
receiving first input that selects a first location of the physical space;
based on a current location of the user equipment, selecting the physical space, wherein the map data is associated with a region of the physical space;
receiving second input that selects a second location of the physical space different than the first location;
determining a Fresnel zone between the first location and the second location;
based on the current location of the user equipment and the map data, instructing the user interface device to present a representation of the Fresnel zone; and
in response to the Fresnel zone being determined to be obstructed by an object, instructing the user interface device to accentuate the object by highlighting the object in a defined color different than a color of the representation.

2. The user equipment of claim 1, wherein the operations further comprise:
receiving third input representative of a signal frequency selected in connection with the network planning procedure.

3. The user equipment of claim 2, wherein the Fresnel zone is determined as a function of the third input.

4. The user equipment of claim 2, wherein an area of a cross-section of the Fresnel zone is determined as a function of the signal frequency.

5. The user equipment of claim 2, wherein the operations further comprise interactively updating the representation of the Fresnel zone in response to changes to any of a group comprising:
the first location, the second location, and the signal frequency.

6. The user equipment of claim 1, wherein the operations further comprise:
performing an obstruction procedure that, based on the map data, determines whether the Fresnel zone is likely to be obstructed by the object in the physical space.

7. The user equipment of claim 6, wherein the operations further comprise:
updating the map data presented by the user interface device to further accentuate the object.

8. The user equipment of claim 6, wherein the obstruction procedure comprises determining the object obstructs the Fresnel zone at a top portion of the Fresnel zone.

9. The user equipment of claim 6, wherein the obstruction procedure comprises determining the object obstructs the Fresnel zone at a side portion of the Fresnel zone.

10. The user equipment of claim 1, wherein the user interface device further presents a simulation element that, in response to input, updates the map data to reflect the physical space at a different time of year.

11. The user equipment of claim 1, wherein the operations further comprise:
performing a map editing procedure that, in response to input, updates an object of the representation of the physical space.

12. A non-transitory machine-readable medium, comprising executable instructions that, when executed by a processor, facilitate performance of operations, comprising:
presenting, via a user interface device, map data that is indicative of a three-dimensional representation of a physical space that comprises the processor;
receiving first input that indicates a first location of the physical space;
based on a current location of a mobile device, selecting the physical space, wherein the map data is associated with a region of the physical space;
receiving second input that indicates a second location of the physical space different from the first location;
determining a Fresnel zone between the first location and the second location;

based on the current location of the mobile device and the map data, presenting, via the user interface device, a representation of the Fresnel zone; and in response to the Fresnel zone being determined to be obstructed by an object, accentuating, via the user interface device, the object by highlighting the object in a defined color different than a color of the representation.

13. The non-transitory machine-readable medium of claim 12, wherein the operations further comprise:
receiving third input indicative of a signal frequency selected in connection with a network planning procedure.

14. The non-transitory machine-readable medium of claim 13, wherein the operations further comprise:
interactively updating the representation of the Fresnel zone in response to changes to any of a group comprising: the first location, the second location, and the signal frequency.

15. The non-transitory machine-readable medium of claim 12, wherein the operations further comprise:
performing an obstruction procedure that determines whether the Fresnel zone is likely, according to a likelihood function, to be obstructed by the object in the physical space based on the map data.

16. The non-transitory machine-readable medium of claim 15, wherein the obstruction procedure comprises determining that the object obstructs the Fresnel zone at a top portion of the Fresnel zone or a side portion of the Fresnel zone.

17. A method, comprising:
instructing, by a user equipment comprising a processor, a user interface device to present map data indicative of a three-dimensional representation of a physical space that is proximal to the user equipment;

receiving, by the user equipment, first input that indicates a first location of the physical space;

receiving, by the user equipment, second input that indicates a second location of the physical space;

based on a current location of the user equipment, selecting, by the user equipment, the physical space, wherein the map data is associated with a region of the physical space;

determining, by the user equipment, a Fresnel zone between the first location and the second location;

based on the current location of the user equipment and the map data, instructing, by the user equipment, the user interface device to present a representation of the Fresnel zone; and in response to the Fresnel zone being determined to be obstructed by an object, instructing, by the user equipment, the interface device to accentuate the object by highlighting the object in a defined color different than a color of the representation.

18. The method of claim 17, further comprising:
performing, by the user equipment, an obstruction procedure that determines whether the Fresnel zone is likely to be obstructed by the object in the physical space based on the map data.

19. The method of claim 18, further comprising:
updating, by the user equipment, a presentation of the map data being presented to accentuate the object determined to obstruct the Fresnel zone.

20. The method of claim 18, wherein the obstruction procedure comprises determining that the object obstructs the Fresnel zone at a top portion of the Fresnel zone or a side portion of the Fresnel zone.

* * * * *